United States Patent
Hsieh et al.

(10) Patent No.: US 8,328,370 B2
(45) Date of Patent: Dec. 11, 2012

(54) PROJECTOR

(75) Inventors: Ming-Chih Hsieh, Tu-Cheng (TW); Tsung-Hsi Li, Tu-Cheng (TW)

(73) Assignee: Hon Hai Precision Industry Co., Ltd., Tu-Cheng, New Taipei (TW)

( * ) Notice: Subject to any disclaimer, the term of this patent is extended or adjusted under 35 U.S.C. 154(b) by 272 days.

(21) Appl. No.: 12/910,992

(22) Filed: Oct. 25, 2010

(65) Prior Publication Data

US 2011/0235002 A1  Sep. 29, 2011

(30) Foreign Application Priority Data

Mar. 24, 2010  (TW) .............................. 99108742 A

(51) Int. Cl.
*G03B 21/14* (2006.01)
(52) U.S. Cl. ......................................... 353/101; 353/70
(58) Field of Classification Search .................. 353/69, 353/70, 100, 101
See application file for complete search history.

(56) References Cited

U.S. PATENT DOCUMENTS 5,788,355 A * 8/1998 Na ................................. 353/101
8,246,179 B2 * 8/2012 Hsieh et al. ................... 353/101

* cited by examiner

*Primary Examiner* — William C Dowling
(74) *Attorney, Agent, or Firm* — Altis Law Group, Inc.

(57) ABSTRACT

A projector includes a housing, a lens module pivotally connected to the housing, a first adjustment mechanism adjusting a pitch of the housing, and a second adjustment mechanism adjusting a pitch of the lens module. The first adjustment mechanism includes a threaded base fixed to the housing, and a support leg extending out of the housing and comprising a threaded portion. The second adjustment mechanism includes a first gear driven by the support leg, a second gear engaging the first gear, a first threaded member fixed to the second gear, a first connecting member pivotally connected to the lens module, a second connecting member slidably connected to the first connecting member, and a second threaded member. The second threaded member is fixed to the second connecting member, and threaded on and slidable relative to the first threaded member.

14 Claims, 5 Drawing Sheets

PROJECTOR

BACKGROUND

1. Technical Field

The present disclosure generally relates to projector technology, and particularly, to a projector with adjustable pitch.

2. Description of Related Art

A projector includes a housing and a lens module mounted in and fixed to the housing. Typically, an adjustment apparatus at the bottom of the housing allows adjustment of the pitch of the housing. The adjustment apparatus includes a support leg with a threaded portion and a threaded base fixed to the housing. The threaded portion is received in the threaded base, and rotation thereof changes the pitch of the housing. However, when the housing is moved up or down, the lens modules move together with the housing, altering the projection direction of the lens module and distorting the projected image.

Therefore, there is room for improvement within the art.

BRIEF DESCRIPTION OF THE DRAWINGS

The components in the drawings are not necessarily drawn to scale, the emphasis instead being placed upon clearly illustrating the principles of the present disclosure. Moreover, in the drawings, like reference numerals designate corresponding parts throughout the several views.

DETAILED DESCRIPTION

Figure 1:
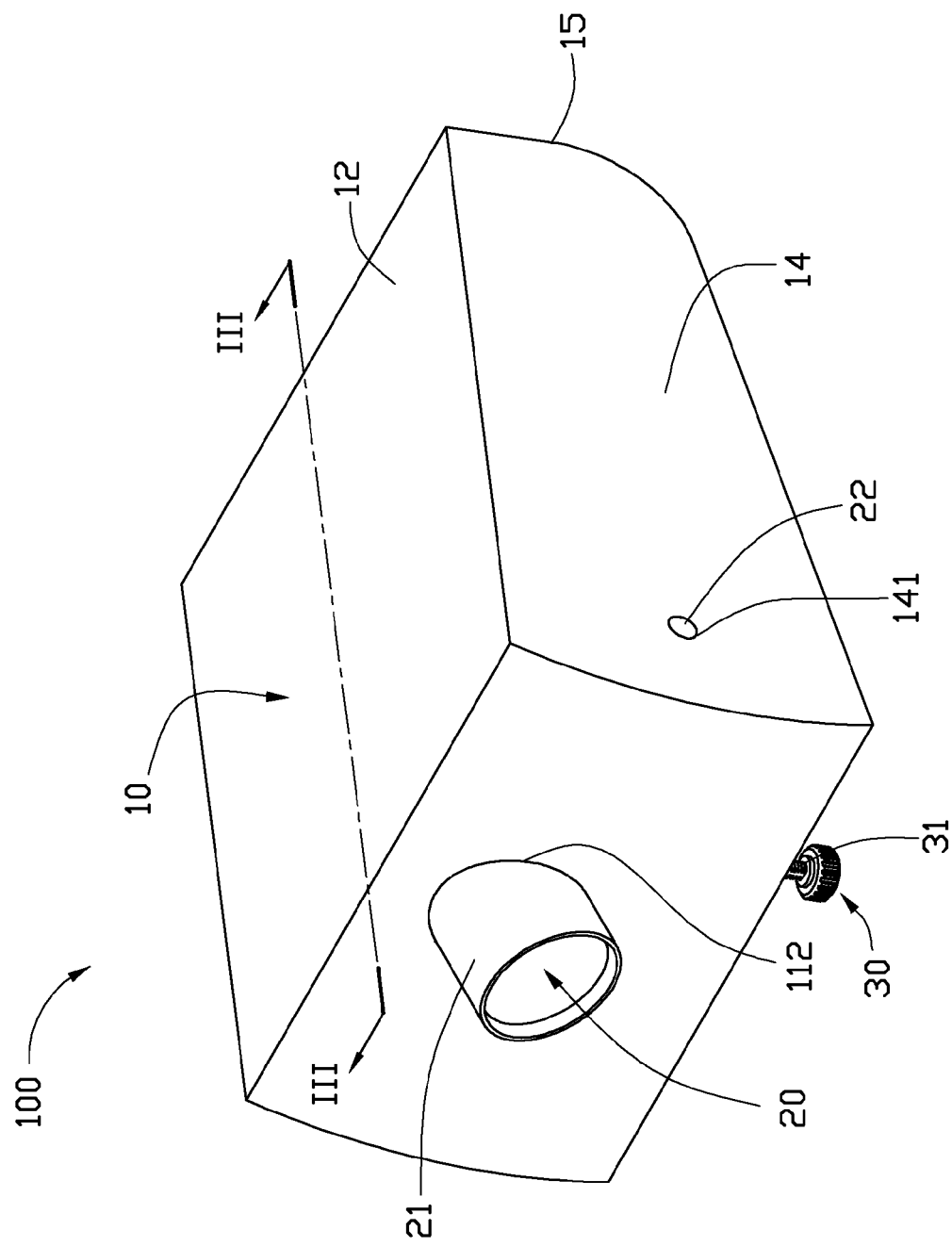
FIG. 1 is an assembled, isometric view of one embodiment of a projector having a housing and a lens module.
Figure 2:
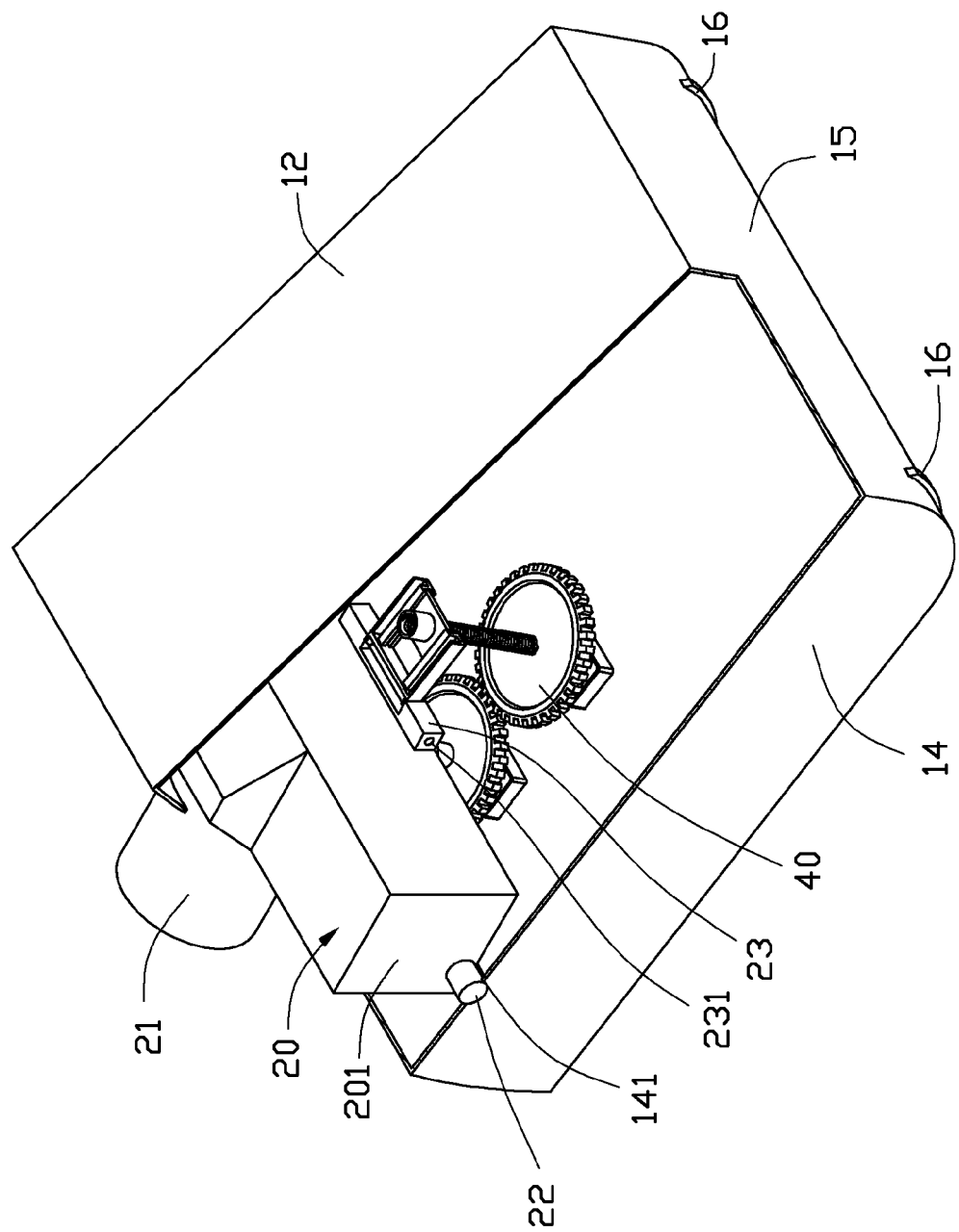
FIG. 2 is a partial cross section of the projector of FIG. 1.

Referring to FIGS. 1 and 2, one embodiment of a projector 100 includes a housing 10, a lens module 20 pivotally connected to the housing 10, a first adjustment mechanism 30 for adjusting a pitch of the housing 10, and a second adjustment mechanism 40 for adjusting a pitch of the lens module 20. The second adjustment mechanism 40 is interconnected to the first adjustment mechanism 30, so that when the projector 100 is placed on a surface, projection of the lens module 20 can be maintained in a predetermined direction by the first and second adjustment mechanisms 30, 40.

Figure 3:
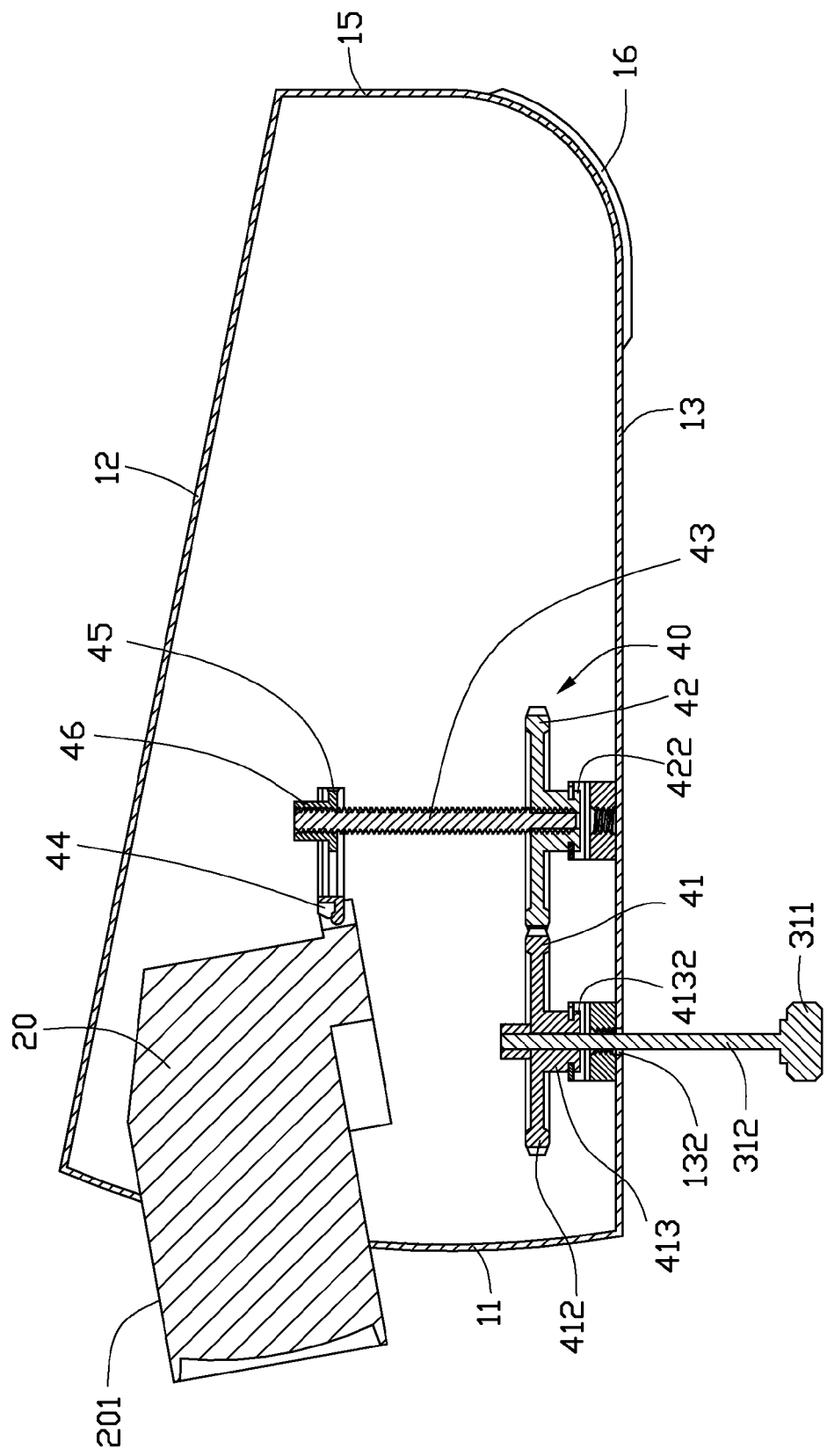
FIG. 3 is a cross section of the projector of FIG. 1, taken along lines III-III in FIG. 2.

Referring also to FIG. 3, the housing 10 includes a front wall 11, a top surface 12, a bottom surface 13, two sidewalls 14, and a rear wall 15 opposite to the front wall 11. The front wall 11 defines an opening 112 through which the lens module 20 extends out of the housing 10. Each sidewall 14 defines a first pivot hole 141, and the bottom surface 13 defines an assembly hole 132 adjacent to the front wall 11 and positioned at a front section of the bottom surface 13. Two support portions 16 protrude at the rear section of the bottom surface 13 to contact the surface. Each support portion 16 is substantially arcuate. In other embodiments, the support portions 16 can be omitted, and the rear section of the bottom surface 13 directly contacts the surface.

Figure 4:
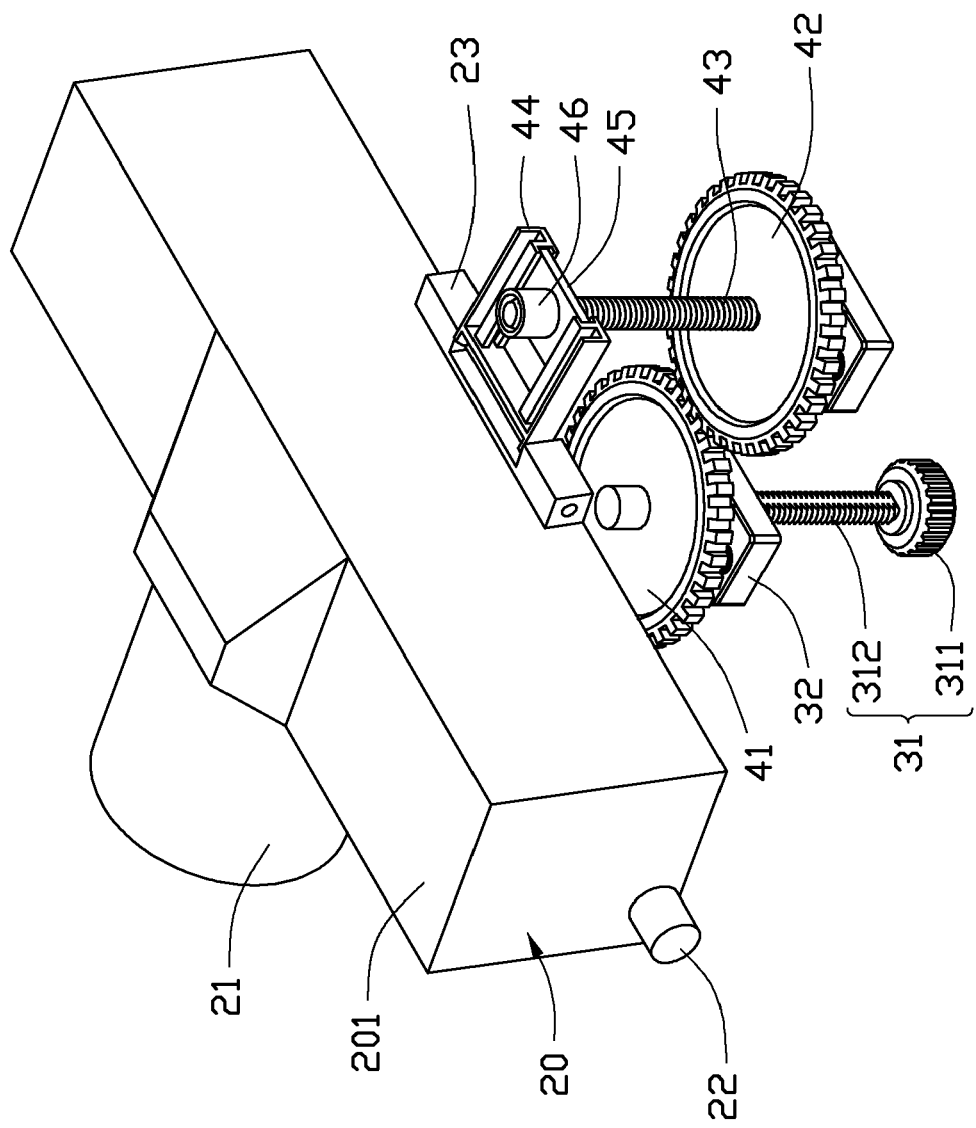
FIG. 4 is an assembled, isometric view of the projector of FIG. 1, with the housing omitted.
Figure 5:
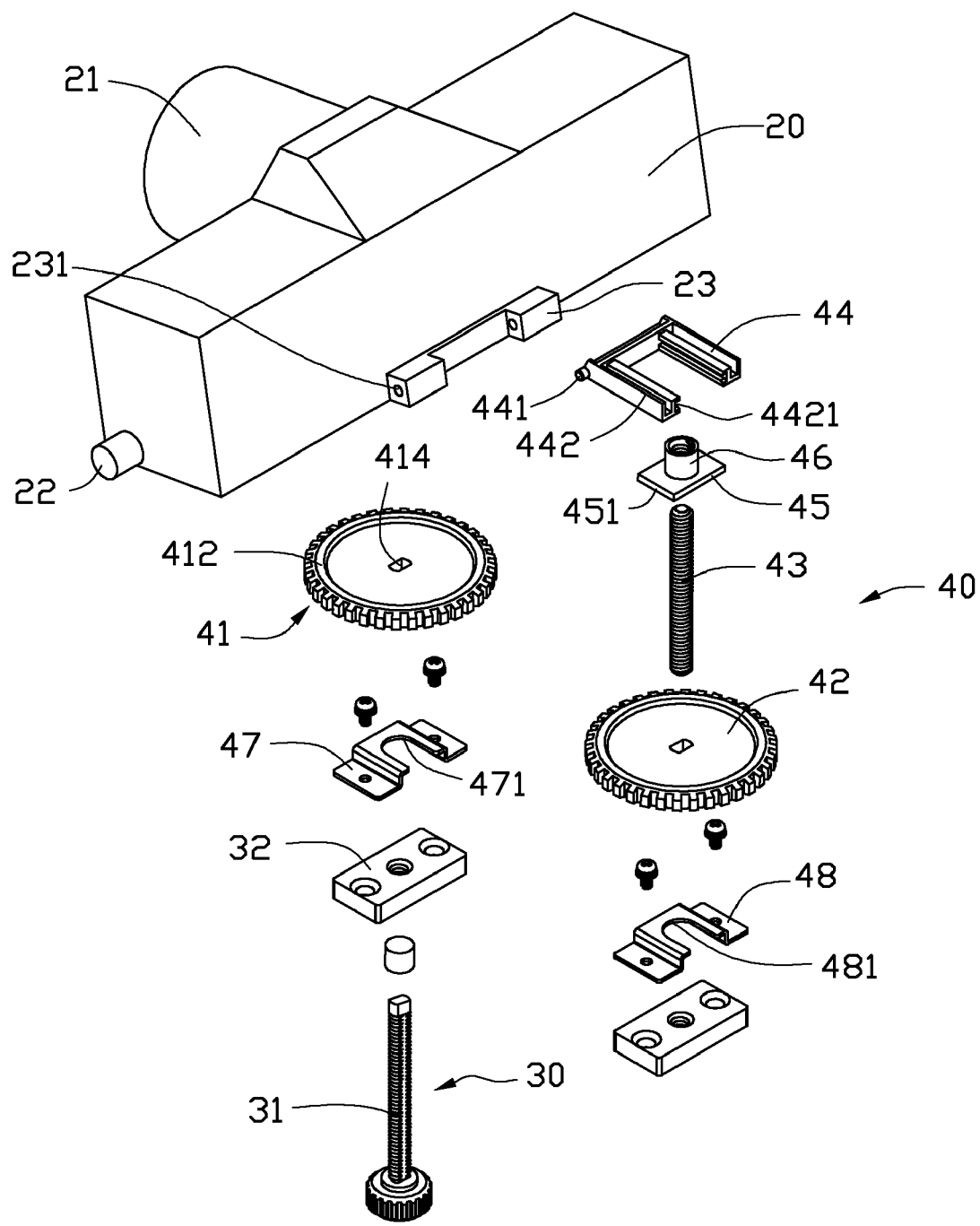
FIG. 5 is an exploded, isometric view of the projector of FIG. 4.

Referring also to FIGS. 4 and 5, the lens module 20 includes a main body 201, a lens 21 positioned on the front section of the main body 201, two pivot shafts 22 on opposite sides of the main body 201, and a connecting portion 23 on the rear section. The lens 21 is movably received in the opening 112 of the housing 10. The first pivot shaft 22 is pivotally received in the first pivot hole 141, thus pivotally connecting the lens module 20 and the housing 10. The connecting portion 23 is substantially U-shaped, and defines two second pivot holes 231 on opposite sides.

The first adjustment mechanism 30 includes a support leg 31 and a threaded base 32 fixed to the bottom surface 13 of the housing 10. The support leg 31 includes a contact end 311 and a threaded portion 312 with a non-circular cross section. The support leg 31 passes through the assembly hole 132 with the threaded portion 312 received in the threaded base 32, and the contact end 311 extends out of the housing 10 to contact the surface on which the projector 100 is located, whereby housing 10 is cooperatively supported by the support leg 31 and the support portions 16. When the support leg 31 is rotated, the threaded portion 312 moves out of or into the threaded base 32, such that a front portion of the housing 10 elevates or descends, and the pitch of the housing 10 is correspondingly adjusted.

Referring to FIGS. 3 and 5 again, the second adjustment mechanism 40 includes a first gear 41 driven by the support leg 31, a second gear 42 engaging the first gear 41, a first threaded member 43 secured to the second gear 42, a first connecting member 44 pivotally connected to the lens module 20, a second connecting member 45 slidably connected to the first connecting member 44, and a second threaded member 46 threaded on the first threaded member 43 and slidable relative thereto. When the second gear 42 is rotated together with the first gear 41, the second threaded member 46 moves up and down along the first threaded member 43.

Furthermore, the second adjustment mechanism 40 includes a first assembly member 47 to prevent the first gear 41 from moving in a vertical direction, and a second assembly member 48 to prevent the second gear 42 from moving in a vertical direction. The first and second gears 41, 42, and the first and second assembly members 47, 48 have similar structures.

The first gear 41 includes a toothed portion 412 with a plurality of outer teeth and a connecting shaft 413. The number of teeth of the first and second gears 41, 42 can vary, thus the second gear 42 can achieve a predetermined rotation speed. The first gear 41 further defines a though hole 414 in the central portion thereof. The though hole 414 has a non-circular cross section, corresponding to that of the threaded portion 312 of the support leg 31, thus the threaded portion 312 can be fixed to the first gear 41 when received in the though hole 414.

The first assembly member 47 is secured to the threaded base 32 and defines a cutout 471 in a U-shape. The connecting shaft 413 defines a groove 4132 in the outer circumference. The connecting shaft 413 is received in the cutout 471, and the first assembly member 47 is received in the groove 4132, thus the first gear 41 is rotatably connected to the first assembly member 47 and maintains a vertical position. The second assembly member 48 is similar to the first assembly member 47, and the second gear 43 is rotatably connected to the second assembly member 48 in such a manner that the second assembly member 48 is received in the a cutout 481 and received in a groove 422, thus the second gear 42 can maintain a vertical position.

The first connecting member 44 includes a second pivot shaft 441 and two slide portions 442 extending from opposite ends of the second pivotal shaft 441. The second pivot shaft 441 is pivotally connected to the second pivot hole 231 of the connection portion 23. Each slide portion 442 defines a slide groove 4421 in the opposite surface. The second connecting member 45 is a plate with opposite sides 451 slidably received in the slide grooves 4421, respectively. The second connecting member 45 defines a through hole (not labeled) to receive the first threaded member 413.

In the illustrated embodiment, the first threaded member 43 has internal threads, and the second threaded member 46 has external threads. The first threaded member 43 and the threaded portion 312 of the support leg 31 have reversed threads. The second threaded member 46 is integrally formed with the second connecting member 45. One end of the first threaded member 43 is fixed to the second gear 42, and the other end passes through the second connecting member 45 and is received in the second threaded member 46. In other embodiments, the first threaded member 43 may have external threads, and the second threaded member 46 may have internal threads.

In use, the housing 10 is placed on a surface, with the support leg 30 and the support portions 16 contacting the surface. When there is need to adjust the pitch of the housing 10, the support leg 31 is rotated. The first gear 41 rotates together with the support leg 31 and rotates the second gear 42 in an opposite direction. The first threaded member 43 rotates together with the second gear 42, and the second threaded member 46 moves up and down relative to the first threaded member 43 via the engagement of the first and second threaded members 43, 46. The first and second connecting members 44, 45 move together with the second threaded member 46, and the second connecting member 45 slides relative to the first connecting member 45, thus the first connecting member 44 rotates the lens module 20 around the first pivot shaft 22 thereof. Therefore, when the pitch of the housing 10 is adjusted, the pitch of the lens module 20 can be adjusted accordingly, thus projection of the lens module 20 can be maintained in a predetermined direction. The distortion of the projected image can be reduced.

It is believed that the present embodiments and their advantages will be understood from the foregoing description, and it will be apparent that various changes may be made thereto without departing from the spirit and scope of the disclosure or sacrificing all of its material advantages.

What is claimed is:

1. A projector comprising:
    a housing;
    a lens module pivotally connected to the housing;
    a first adjustment mechanism for adjusting a pitch of the housing, the first adjustment mechanism comprising:
        a threaded base fixed to the housing; and
        a support leg extending out of the housing and comprising a threaded portion; and
    a second adjustment mechanism for adjusting a pitch of the lens module, the second adjustment mechanism interconnected to the adjustment mechanism and comprising:
        a first gear driven by the support leg;
        a second gear engaging the first gear;
        a first threaded member fixed to the second gear;
        a first connecting member pivotally connected to the lens module;
        a second connecting member slidably connected to the first connecting member; and
        a second threaded member fixed to the second connecting member, threaded on the first threaded member, and slidable relative thereto.

2. The projector of claim 1, wherein the first gear defines a through hole in the central portion thereof with a non-circular cross section, and the threaded portion comprises a non-circular cross section corresponding to that of the through hole and received in the through hole.

3. The projector of claim 1, further comprising a first assembly member fixed with the housing and defining a first cutout; the first gear comprises a first connecting shaft defining a first groove; the first connecting shaft is received in the first cutout with the first assembly member received in the first groove, whereby the first gear is rotatably connected to the first assembly member and maintains a vertical position.

4. The projector of claim 3, further comprising a second assembly member fixed with the housing and defining a second cutout; the second gear comprises a second connecting shaft defining a second groove in which the second connecting shaft is received with the second assembly member received in the second groove, whereby the second gear is rotatably connected to the second assembly member and maintains a vertical position.

5. The projector of claim 1, wherein the housing comprises a front wall, a top surface, a bottom surface, two sidewalls, and a rear wall opposite to the front wall, the front wall defining an opening for receiving the lens module.

6. The projector of claim 5, wherein each sidewall defines a first pivot hole, and the lens module comprises a first pivot shaft received in the first pivot hole.

7. The projector of claim 6, wherein the lens module defines a second pivot hole on the rear section thereof, and the first connecting member comprises a second pivot shaft received in the second pivot hole.

8. The projector of claim 7, wherein the first connecting member comprises two sliding portions extending from opposite ends of the second pivot shaft, and each sliding portion defines at least one slide groove, in which the second connecting member is slidably received.

9. The projector of claim 1, wherein the first threaded member is integrally formed with the second connecting member.

10. The projector of claim 1, wherein the first threaded member has external threads, and the second threaded member has internal threads.

11. The projector of claim 5, further comprising two support portions positioned on the rear section of the bottom surface to cooperatively support the housing with the support leg.

12. The projector of claim 11, wherein each support portion is substantially arcuate.

13. The projector of claim 1, wherein the threaded portion of the support leg and the first threaded member have reversed threads.

14. A projector comprising:
    a housing;
    a lens module pivotally connected to the housing;
    a threaded base fixed to the housing; and
    a support leg positioned on a bottom front section of the housing, the support leg extending out of the housing and comprising a threaded portion;
    a first gear driven by the support leg;
    a second gear engaging the first gear;
    a first threaded member fixed to the second gear;
    a first connecting member pivotally connected to the lens module;
    a second connecting member slidably connected to the first connecting member; and
    a second threaded member fixed to the second connecting member, and threaded on and slidable relative to the first threaded member, wherein when the support leg is rotated to adjust the pitch of the housing, the movement of the support leg is transferred to the lens module via the first and second gears, the first and second threaded members, and the first and second connecting members, thus the pitch of the lens module is correspondingly adjusted and projection of the lens module is maintained in a predetermined direction.

* * * * *